Figure 1:
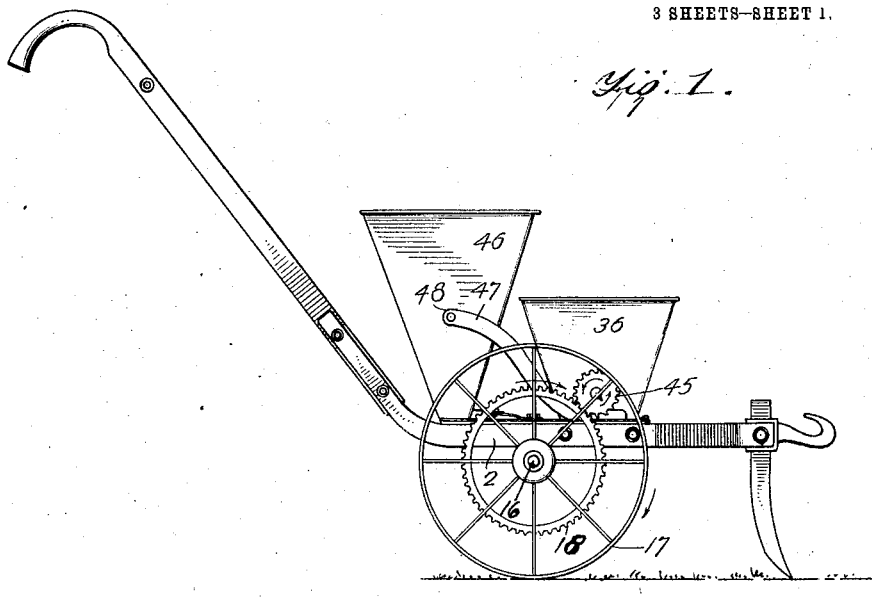
Figure 8:
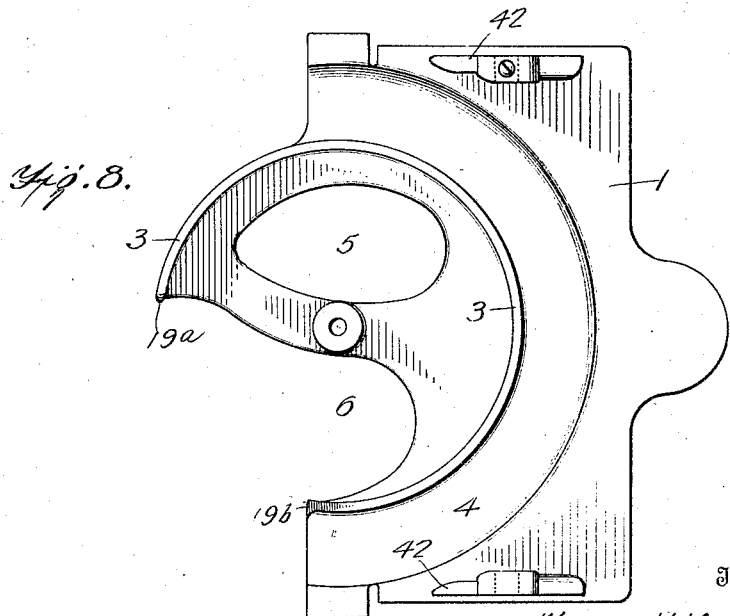

W. H. YOUNG.
COTTON SEED PLANTER.
APPLICATION FILED SEPT. 19, 1911.

1,054,889.

Patented Mar. 4, 1913.

3 SHEETS—SHEET 1.

Witnesses
L. H. Schmidt
J. Stewart Rice

Inventor
WILLIAM H. YOUNG,

Attorneys

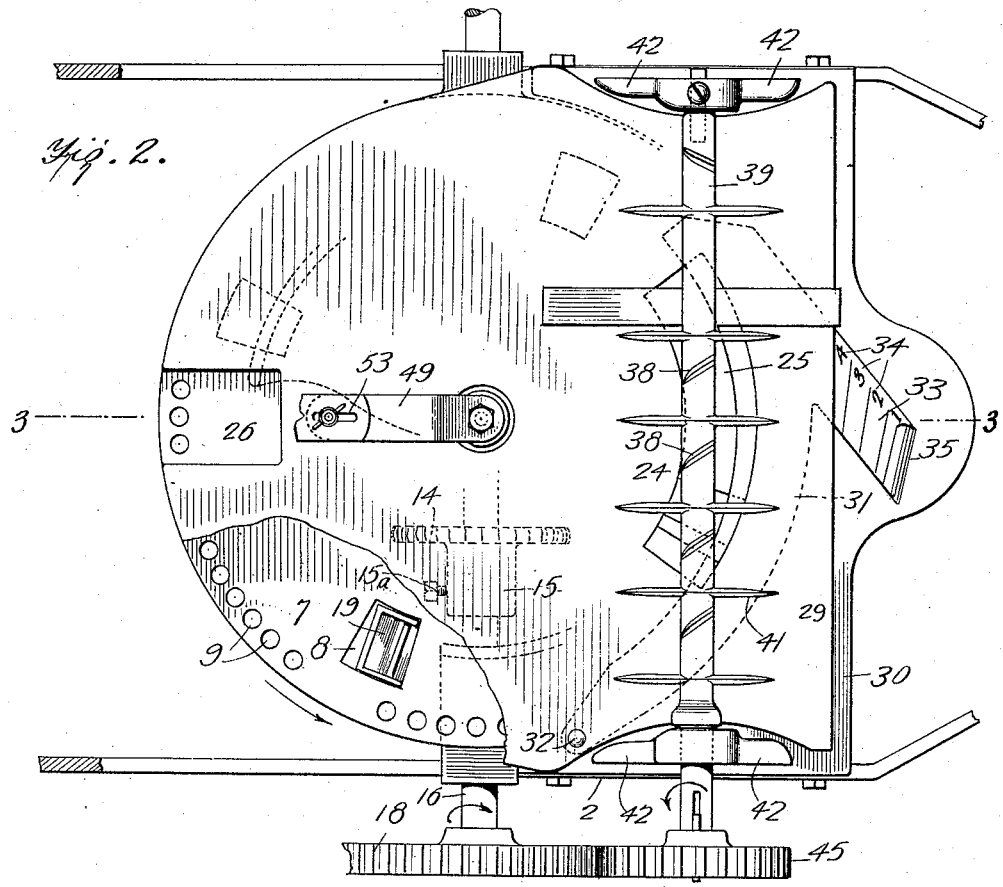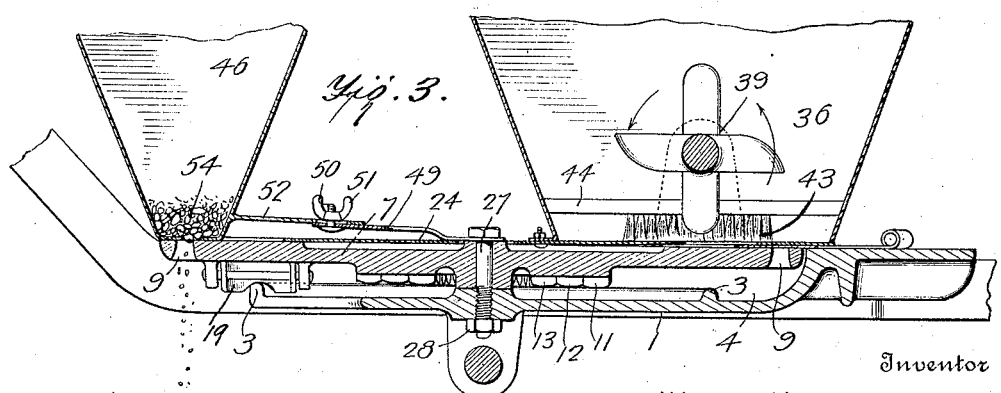

W. H. YOUNG.
COTTON SEED PLANTER.
APPLICATION FILED SEPT. 19, 1911.
1,054,889.
Patented Mar. 4, 1913.
3 SHEETS—SHEET 3.
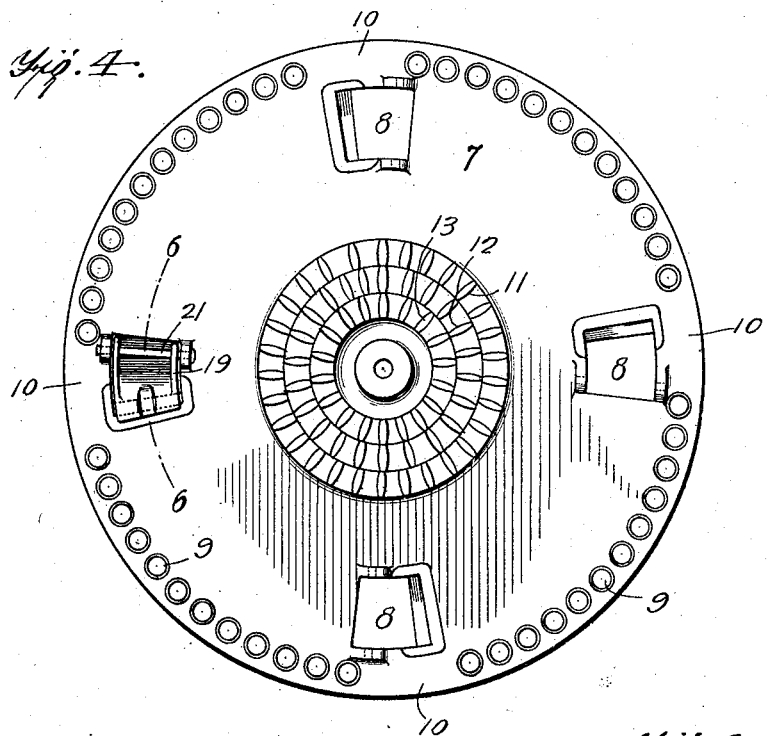
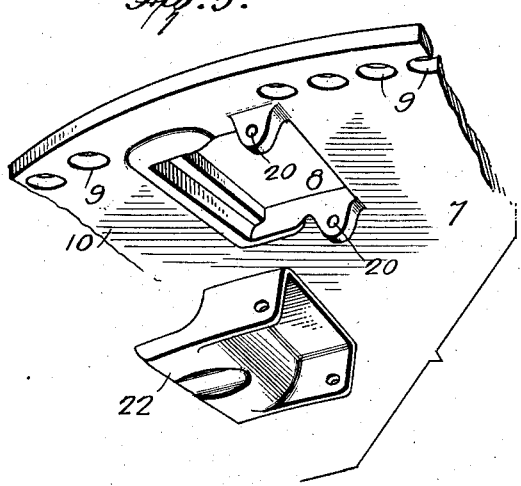
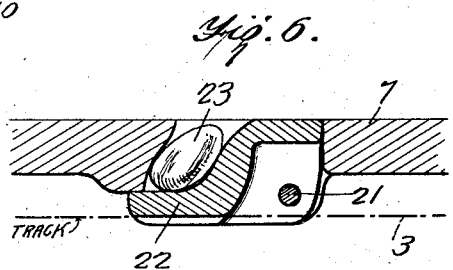
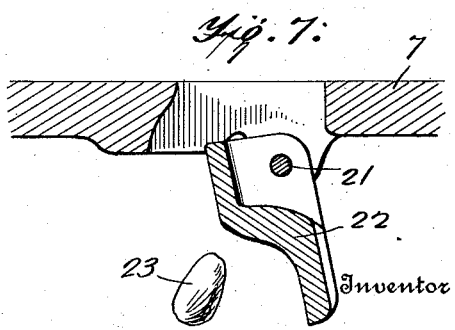
Witnesses
WILLIAM H. YOUNG,
Inventor
Attorneys

UNITED STATES PATENT OFFICE.

WILLIAM H. YOUNG, OF ATLANTA, GEORGIA.

COTTON-SEED PLANTER.

1,054,889.  Specification of Letters Patent.  Patented Mar. 4, 1913.

Application filed September 19, 1911. Serial No. 650,260.

*To all whom it may concern:*

Be it known that I, WILLIAM HENRY YOUNG, a citizen of the United States, residing at Atlanta, in the county of Fulton and State of Georgia, have invented new and useful Improvements in Cotton-Seed Planters, of which the following is a specification.

My invention, relating to cotton-seed planters, is designed to remove several serious imperfections in cotton-seed planters as now constructed, and to make possible other desirable results necessary for the most advanced methods of cotton culture.

In every form of cotton seed planter heretofore known, there have been present one or both of two opposite defects; that is to say, either the planter has wasted the seed, of itself a great loss, and which made necessary, besides, a costly and burdensome "blocking out" or chopping of unnecessary plants, or else, when the planter limited the seed in number and distances, there was a tendency to "miss" and, thus, fail to "make a stand" when the plants came up.

It is an important object, among others, of my invention to overcome the first defect, aforesaid, by dropping the seeds in hills, at regular intervals, without wasting the seeds required by continuous planting, or requiring any "blocking out". This saves a large sum in the cost of seed and in the wages of laborers for "chopping".

It is an important object of my invention to overcome the second defect, aforesaid, by using what I term "trap-doors" to gather and drop the seed.

Hill planters, as usually constructed, are provided with seed-dropping pockets of constant area, and, cotton seed being similar to the proverbial chestnut bur in its persistent tendency to cling to everything that it touches, it has been necessary, in former hill-planters, to provide devices (such as pistons, wipers, etc.) to force the seeds out of their narrow pockets, all of which devices are more or less inefficient for the purposes intended. Thus, with former hill planters, the planting has been uncertain, and, as the farmer is seldom able to see whether the seeds have really dropped or not, he has to wait till too late to plant again, only to find many hills missing and his labor in part lost.

It is an object of the present invention to remedy the defect mentioned in the preceding paragraph, and this is accomplished by providing movable trap-doors or buckets, which are operable, in closed position, to present a restricted pocket in which to gather the seed, but which are automatically releasable, periodically, to increase, as it were, the area of said pockets when the seeds are to be dumped, so that the lint of the seed shall have nothing to cling to; the trap-doors, upon release thereof, dumping the seeds with a sharp snap, thus shaking the seeds off in a positive manner, and obviating the great objection of "missing", which has characterized cotton-seed planters as usually constructed.

In addition, it is an object of my invention to provide a structure that will permit the seed to be dropped right before the eyes of the operator, who is enabled thereby to stop the planter, if there should be any failure of the seeds to drop, as from the seed-supply becoming exhausted.

It is a further object of the invention to provide means whereby the intake of seeds to the seed trap-doors shall be variable, *i. e.,* adjustable. For instance, if the seed-pockets or trap-doors are constructed to be capable of gathering, say, six cotton-seeds, the operator may, with my mechanism, regulate the intake of seeds to said pockets, whereby the latter may gather any desired predetermined number of seeds less than six, to satisfy the exigencies of the particular situation, *i. e.,* the character of the soil, etc.

A further object is to provide novel means for regulating the distance between the hills, it being well known that the distance between hills needs to be varied with different soils, seeds and systems. With cotton-seed planters, as usually constructed, separate plates or parts have to be substituted, to effect such change in the distance between the hills; but, with my invention, no new parts have to be added, or old parts removed, my planter being so constructed that it may be regulated to plant hills at different distances apart with ease and celerity, and with the use of the same parts as before.

A further important object is to insure that the fertilizer shall not be dropped with the seed and in contact therewith, whereby I eliminate the danger of burning and injuring the seed. In fertilizer-distributers, as customarily constructed, the fertilizer is dropped continuously, so that some thereof gets in with the seed, which is thus liable to be burned and injured.

In general, I aim to construct a planter which shall possess the virtues of simplicity, compactness, strength or durability, relative cheapness of production, and the maximum of efficiency in operation.

With these objects in view, and others appearing as the specification proceeds and the nature of the invention more fully appears, the invention resides in the novel construction, combination and arrangement of parts of a cotton-seed planter, as will be fully hereinafter described in the specification, summed up in the claims, and illustrated in the accompanying drawings.

In the drawings, forming part of my application and specification, I have shown one form of embodiment capable of carrying out the underlying principles of the invention; and in these drawings: Figure I is a side elevation of a cotton-seed planter constructed in accordance with my invention; Fig. II is a top plan view thereof, partly broken away and with the hoppers and wheels removed; Fig. III is a fragmentary longitudinal vertical section, of Fig. II, the wheels being removed; Fig. IV is a bottom plan view of the rotatable feeding disk carrying the trap-doors or seed-buckets, only one of the latter being shown, the remainder being removed; Fig. V is a fragmentary perspective view of the seed-feeding disk, looking at the bottom thereof, showing, detached, one of the said trap-doors; Fig. VI is a vertical sectional view, on the line 6—6 of Fig. IV, showing the trap-door in closed position; Fig. VII is a similar view, showing the trap-door in open position, i. e., in tilted or seed-dumping position. Fig. VIII is a detail view, in top plan, of a peculiar form of casting carrying integral guideways and tracks for the seed-pockets of the traveling feeding-disk.

Referring, now, in detail to the drawings: 1 represents a casting, which, as shown, is formed as a plate constituting a stationary base member, which may be removably secured in a horizontal position, to the side rails 2 of the frame of the planter. This base-member is provided, on its upper surface, with a rib 3, describing the arc of a circle, and constituting, in function, a track, as will hereinafter clearly appear; with arcuate groove or depressed or sunken portion or channel 4, contiguous to the track 3, and also describing the arc of a circle; with an opening 5; and with a cut-away portion 6.

The peculiar form of the member 1, as just hereinabove described, is deemed important, since it forms a very strong structure and, moreover, since it presents, in one integral body, (1) a strong base for supporting thereon the parts about to be described, and (2) guideways and tracks for the feed-pockets of a traveling feeding-member, about to be described. Supported directly above said base 1 is a traveling or rotating feeding member 7, preferably formed as a disk or wheel horizontally positioned, and having, in this instance, a single series of apertures therethrough, identified by the number 8, although it is to be understood that two or more of such series may be provided, if it is desired with my machine to plant, simultaneously, two or more rows. These apertures 8 are preferably disposed near the edge of said disk, as shown, and through these apertures the cotton-seed passes to the ground. Also extending around the edge of the disk is a series of apertures 9, through which fertilizer passes to the ground. These apertures 9 are constructed tapering, as shown in Fig. III, i. e., the narrowest width thereof is at the top, thence of gradually increasing width to the bottom. This formation of the apertures is advantageous, as a sharp cutting edge is presented, which cuts up all lumps and reduces the fertilizer to the proper consistency.

The invention contemplates a construction whereby the passage of fertilizer through the disk 7 simultaneously with the passage of seed therethrough is prevented, and, while various means and constructions may be resorted to for effecting this, I prefer, simply, to interrupt the series of apertures 9, as at the regions 10 adjacent to the edge of the disk 7, whereby passage of fertilizer through the disk 7 is prevented during the passage of cotton seed through the disk. This construction prevents fertilizer falling into direct contact with the seeds, and obviates burning or injuring of the seeds by the fertilizer. The fertilizer falls the proper distance from the seeds, and the roots from the seeds reach out at the proper time to the fertilizer in the furrow.

The invention contemplates means for varying the rapidity of travel of the rotatable disk 7, and, while these means may take various forms, I prefer that shown in the drawings, as it is exceedingly simple and efficacious for the purpose in view. The type of means shown, therefore, as an example, comprises two or more (in this instance, three are shown in the drawings) concentric racks 11, 12, 13, carried by the bottom surface of the disk 7. Engageable with any one of the said three series of racks is a pinion 14 carried by a concentric hub 15, provided with a set-screw 15ª, reciprocable longitudinally on a rotating axle 16, fast on which are mounted the wheels 17 of the planter. The axle also carries a gear 18, for a purpose hereinafter appearing. Thus, by moving the pinion 14 to engage the rack 11, the disk 7 will be driven at its slowest speed, thus dropping the seed at relatively long intervals apart; by causing the pinion to engage the next rack 12, the disk will be driven at accelerated speed, thus dropping the seeds at relatively shorter intervals; and, by causing the pinion to engage the rack 13, the disk will be driven at its maximum speed, to drop the seed at, relatively, the shortest intervals.

The disk 7 carries, in the region of the apertures 8, movable seed-pockets or members or buckets 19, which I term trap-doors, one of these trap-doors or seed-buckets being provided for each aperture 8. Each door is pivoted, as at 20, 20, on a pivot rod 21, to said disk 7, and is provided with a depressed portion 22 adapted, when the door is closed, as shown in Fig. VI, to support, below the level of the top of the disk 7, a seed or seeds 23. In function, these members, 19, constitute a combined trap-door and seed-bucket. In practice, of course, the trap-doors support, each, a number of seeds, say six, the capacity of the buckets depending upon the size thereof.

Preferably, a stationary plate 24 is provided, disposed directly above the disk 7, and formed with an arcuate slot 25, with which the openings 8 with the buckets 19 register, successively, in the rotation of the disk 7; said plate 24 being also formed with a cut-away portion 26, permitting passage of fertilizer through said plate to the openings 9 in the disk 7. The plate 24 and disk 7 may be held assembled with relation to the base 1 by any suitable means, as by a bolt 27 passing through said plate and disk and screwed into said base, and carrying a nut 28 on the threaded end thereof. The plate 24 may also be secured in any suitable manner to prevent rotation thereof, as by nails, or the like (not shown) driven through the same, near the edge 29 thereof, and into the end member 30 of the framework of the planter.

Suitable means may be provided for regulating the passage of seed to the buckets 19 through the opening 25, and, while such means may take a variety of forms, I prefer that shown in the drawings, as it is very simple and efficacious for the purpose intended. The form shown, therefore, as an example, comprises a movable, arcuate slide or shutter 31, interposed between the plate 24 and the disk 7, and pivoted, at one end, as at 32, to the plate. The shutter desirably carries an arm 33 provided with a graduated scale 34 thereon, said scale comprising transverse, individually numbered lines, as shown. If the shutter 31 is pushed inward till arrested by the curled end 35 of the arm 33 contacting with the edge wall of the end 29 of the plate 24, the shutter will completely cover the openings 25 and 8 and all of the numbers on the scale 34 will be hidden beneath the plate 24; now, then, if the operator wishes only one seed at a time to drop through the opening 8, he pulls outward upon the arm 33 till the line marked 1 registers with the edge 29 of the plate 24, and this will move the slide 31 a sufficient distance to uncover only so much of the opening 8 as will permit one seed to drop therethrough onto the bucket or trap-door 19.

In the operation of the planter, so far as described, movement forward of the planter on the wheels 17 will cause the axle 16 to revolve, revolving the pinion 14, which, meshing with one of the racks 11, 12, or 13, revolves the disk 7 in the direction indicated by the arrow in Fig. II. So long as the trap-doors 19 are above the track 3 of the base 1, they bear and ride thereupon, and the engagement of the track with the bottom of the doors 19 (as shown in Fig. III) maintains the latter in closed position (as shown in Fig. VI); but, as soon as the doors 19 ride off the track at the end 19ª thereof, and reach the cut-away portion 6 of the base 1, they drop, by gravity, on their pivots 21 and dump their load. As soon as the trap-doors reach the inclined end 19ᵇ, or commencement of the track, they ride up onto said tracks, the doors thus automatically resuming their normal closed position, ready to receive another load.

Of course, it is to be understood that other forms of means than that shown may be provided for causing automatic dumping of the trap-doors at a predetermined point in their travel, and for automatically closing said doors at another predetermined point in their travel; the track or rail 3, shown herein for this purpose, being merely an example of one form of means, but which I consider to be preferable, as being very simple and positive and reliable in action.

My cotton-seed hopper 36, disposed transversely of the planter frame and over the slot 25, is designed with a view to preventing balling up and "arching over" of the cotton seed, and, to this end, comprises a relatively shallow, open-bottomed box, having its sides at a wide angle, as shown, to prevent "arching" of the seed. Disposed toward the bottom of the hopper 36 is an agitator, designated generally by 37.

Disposed transversely of the slot 25, over one end thereof, is a brush 43, supported in any suitable manner, in this instance by a shaft 44 carried by the hopper 36. In operation, the traveling buckets or trap-doors 19 successively travel beneath the slot 25, receiving their load of seed, and, as they pass again beneath the plate 24 at the end of the slot 25, the brush 43 wipes away surplus seeds from the buckets, preventing a jam or binding at the said point where the buckets pass beneath the plate, after having traveled the length of said slot 25.

Shaft 39 carries, at one end thereof, a gear 45 meshing with gear 18, and, by this means, the agitator is driven or rotated.

Disposed over the aperture 26 is a fertilizer-hopper 46, provided with a bottom feeding-opening 54 registering with the opening 9.

Having thus fully described my invention, what I claim as new and desire to secure by Letters-Patent is:

1. In a seed-planter, a horizontally-disposed feeding-member carrying a series of pivoted seed-pockets, and a plate-like base member underlying said feeding-member and carrying an integral, raised track maintaining said feed-pockets in normal untilted position and returning said pockets to normal position after tilting thereof to dump their loads.

2. In a seed-planter, a horizontally-disposed feeding-member carrying a plurality of pivoted seed-pockets arranged in a circular series, and a plate-like base-member underlying said feeding-member and carrying an integral, arcuate, raised track maintaining said feed-pockets in normal untilted position and returning said pockets to normal position after tilting thereof to dump their loads.

3. In a seed-planter, a horizontally-disposed feeding-disk carrying a series of pivoted seed-pockets, and a plate-like base member underlying said feeding-member and carrying an integral, raised track maintaining said feeding-pockets in normal untilted position and returning said pockets to normal position after tilting thereof to dump their loads.

4. In a seed-planter, a horizontally-disposed feeding-member carrying a series of pivoted seed-pockets, and a plate-like base member underlying said feeding-member and carrying an integral, raised track maintaining said feed-pockets in normal untilted position and returning said pockets to normal position after tilting thereof to dump their loads, said base-member being provided with a cut-away portion extending from the ends of said track.

5. In a seed-planter, a horizontally-disposed feeding-member carrying a plurality of seed-pockets arranged in a circular series, and a plate-like base-member underlying said feeding-member and carrying an integral, arcuate, raised track and an arcuate groove, the track and groove maintaining said feed-pockets in normal untilted position and returning said pockets to normal position after tilting thereof to dump their loads.

6. In a seed-planter, a movable member provided with a plurality of seed-apertures, combined trap-doors and seed-buckets carried by said members, one thereof for each of said apertures, and means for maintaining said combined trap-doors and seed-buckets in normal untilted position and for returning them to normal position after tilting thereof to dump their loads, said members being provided with a series of fertilizer-openings interrupted or broken in the region of each seed-aperture and each aperture being of greatest width at the bottom, thence of gradually decreasing width to the top thereof.

7. In a seed-planter, a movable member provided with a plurality of apertures therethrough for the passage of seed, combined trap-doors and seed-buckets carried by said members, one thereof for each of said apertures, and means for maintaining said combined trap-doors and seed-buckets in normal untilted position and for returning them to said normal position after tilting thereof to dump their loads, said member being provided with means permitting discharge of fertilizer therethrough at periods of time during the movement of said member different from the time of dumping of said buckets.

8. In a seed-planter, a movable member provided with a plurality of seed-apertures therethrough, combined trap-doors and seed-buckets carried by said members, one thereof for each of said apertures, and means for maintaining said combined trap-doors and seed-buckets in normal untilted position and for returning them to said normal position after tilting thereof to dump their loads, said members being provided with a series of fertilizer-openings therethrough, said series of openings being interrupted or broken in the region of each seed-aperture.

9. In a seed-planter, a movable member provided with a plurality of openings therethrough, a combined trap-door and seed-bucket disposed beneath each of said openings, a member overlying said movable member and provided with a slot, said buckets registering with said slot successively in the movement of said movable member, and means disposed intermediate said movable member and said member overlying the movable member for regulating the flow of seed through said movable-member openings into the buckets underlying said openings.

10. In a seed-planter, a movable member provided with a plurality of openings therethrough, a combined trap-door and seed-bucket disposed beneath each of said openings, a member overlying said movable member and provided with a slot, said buckets registering with said slot successively in the movement of said movable member, and a slide interposed between said movable member and said overlying member for regulating the flow of seed through said openings into said buckets.

11. In a seed-planter, a movable member provided with a plurality of openings therethrough, a combined trap-door and seed-bucket disposed beneath each of said openings, a member overlying said movable member and provided with a slot, said buckets registering with said slot successively in the movement of said movable member, and a pivoted slide interposed between said movable member and said overlying member for regulating the flow of seed through said openings into said buckets.

12. In a seed-planter, a movable member provided with a plurality of openings therethrough, a combined trap-door and seed-bucket disposed beneath each of said openings, a member overlying said movable member and provided with a slot, said buckets registering with said slot successively in the movement of said movable member, and means disposed at one end of said slot for removing surplus seeds from the buckets.

13. In a seed-planter, a movable member provided with a plurality of openings therethrough, a combined trap-door and seed-bucket disposed beneath each of said openings, a member overlying said movable member and provided with a slot, said buckets registering with said slot successively in the movement of said movable member, and a brush disposed at one end of said slot for wiping off surplus seeds from the buckets.

In testimony whereof I have hereunto set my hand in presence of two subscribing witnesses.

WILLIAM H. YOUNG.

Witnesses:
G. W. TAYMAN,
W. A. CALLAWAY.

Copies of this patent may be obtained for five cents each, by addressing the "Commissioner of Patents, Washington, D. C."